United States Patent [19]
Ohi et al.

[11] Patent Number: 5,093,037
[45] Date of Patent: Mar. 3, 1992

[54] ELECTRIC CONDUCTIVE RESIN COMPOSITION

[75] Inventors: Tamio Ohi, 16-18, Daimon 3-chome, Okazaki City, Aichi Pref.; Makoto Yoshida, 23-2, Nishikojouno, Hitotsugi-cho, Kariya City, Aichi Pref.; Kazuhiko Nishimura, 77-2, Jinden, Maebayashi-cho, Toyota City, Aichi Pref.; Mitsuhiro Ozawa, Hekinan; Masami Ishii, Toyota; Takashi Matsuzawa, Seto, all of Japan

[73] Assignees: Tamio Ohi; Makoto Yoshida; Kazuhiko Nishimura, all of Kariya, Japan

[21] Appl. No.: 381,187

[22] Filed: Jul. 18, 1989

[51] Int. Cl.$^5$ .............................................. H01B 1/06
[52] U.S. Cl. .................................. 252/512; 252/518; 524/439; 524/401
[58] Field of Search ............. 252/512, 518; 524/401, 524/439; 428/325, 327, 361, 375

[56] References Cited

U.S. PATENT DOCUMENTS

| 4,564,491 | 1/1986 | Koestechi | 264/108 |
| 4,704,413 | 11/1987 | Nabeta et al. | 252/511 |
| 4,824,871 | 4/1989 | Shinomura | 252/518 |

FOREIGN PATENT DOCUMENTS 60-026057  2/1985  Japan .

Primary Examiner—Josephine Barr
Attorney, Agent, or Firm—Banner, Birch, McKie & Beckett

[57] ABSTRACT

An electric conductive polyphenylene sulfide resin composition comprising: from 15 to 30% by weight of glass fiber with respect to the weight sum of polyphenylene sulfide resin and glass fiber taken as 100% by weight; and from 20 to 30% by volume of copper alloy fiber with respect to the volume sum of polyphenylene sulfide resin, glass fiber and copper alloy fiber taken as 100% by volume. The electric conductive polyphenylene resin composition is an optium material for enclosures for automobile electronics apparatuses which are disposed outside the passenger room.

16 Claims, 1 Drawing Sheet

ELECTRIC CONDUCTIVE RESIN COMPOSITION

BACKGROUND OF THE INVENTION

1. Field of the Invention

The invention relates to an electric conductive thermoplastic resin composition for injection molding, and can be used for molding an automobile electronics skid control sensor case, an automobile speed control CPU case, and the like.

2. Related Art

Japanese Examined Patent Publication (KOKOKU) No. 36069/1987 discloses an art relevant to this invention. The publication discloses an electric conductive polyamide resin composition in which glass fiber, metal short fiber and ethylene ionomer resin are mixed in polyamide resin.

The electric conductive polyamide resin composition exhibits a sharp electric resistance increase during a humidity resistance test because of its high water absorption property. In addition, the polyamide resin composition is poor in humidity resistance property, water resistance property and thermal shock resistance property. Thus, it is hard to apply the polyamide resin composition to mold enclosures for automotive electronics apparatuses because of these problems.

SUMMARY OF THE INVENTION

It is therefore an object of this invention to provide a resin composition having heat resistance property, thermal shock resistance property, humidity resistance property and water resistance property, and applicable to enclosures for automotive electronics apparatuses.

In order to solve the technical problems mentioned above, an electric conductive polyphenylene sulfide resin composition of this invention has been developed, and enclosures for automotive electronics apparatuses have been molded from the electric conductive polyphenylene sulfide resin composition comprising the following:

from 15 to 30% by weight of glass fiber with respect to the weight sum of polyphenylene sulfide resin and glass fiber taken as 100% by weight; and from 20 to 30% by volume of electric conductive metal fiber with respect to the volume sum of polyphenylene sulfide resin, glass fiber and electric conductive metal fiber taken as 100% by volume. The electric conductive fiber may be copper alloy fiber, copper fiber, stainless steel fiber and the like. The copper alloy fiber may be brass fiber.

Polyphenylene sulfide (hereinafter referred to as PPS) resin has heat resistance property, humidity resistance property, water resistance property, high oil resistance property and low thermal expansion property. PPS resin exhibits the other good properties when mixing an electric conductive filler, such as metal fiber and the like, therein.

However, the PPS resin is hard and brittle. In addition to these adverse properties, because the PPS resin is expensive material, the PPS resin should usually be mixed with glass fiber by 30 to 60% by weight when it is actually used. Further, when an electric conductive filler, such as metal fiber and the like, is mixed in the PPS resin containing the glass fiber, the glass fibers remarkably prohibit the metal fibers from contacting each other. Therefore, by mixing the metal fiber by a usual amount it is impossible to achieve low resistance values, i.e. volume resistivity of 10 cm or less, which allow sufficient electromagnetic wave shielding property. Mixing a large amount of the metal fiber is needed to achieve the low resistance values allowing the sufficient electromagnetic wave shielding property, but it results in sharp decrease in moldability, mechanical property and the like, and sharp increase in cost and the like.

In this invention, the content of the glass fiber falls in the range of from 15 to 30% by weight with respect to the weight sum of polyphenylene sulfide resin and glass fiber taken as 100% by weight, and the content of the copper alloy fiber falls in the range of from 20 to 30% by volume with respect to the volume sum of polyphenylene sulfide resin, glass fiber and copper alloy fiber taken as 100% by volume.

When the content of the glass fiber is less than 15% by weight with respect to the weight sum of polyphenylene sulfide resin and glass fiber taken as 100% by weight, the electric conductive resin composition does not exhibit sufficient moldability during injection molding. On the other hand, when the content of the glass fiber is more than 30% by weight with respect to the weight sum of polyphenylene sulfide resin and glass fiber taken as 100% by weight, the electric conductive resin composition does not allow sufficient electromagnetic wave shielding property because the glass fiber prohibits the metal fibers from contacting.

When the content of the copper alloy fiber is less than 20% by volume with respect to the volume sum of polyphenylene sulfide resin, glass fiber and copper alloy fiber taken as 100% by volume, the electric conductive resin composition does not exhibit sufficient electromagnetic wave shielding property because the copper alloy fibers are less likely to contact with each other. On the other hand, when the content of the copper alloy fiber is more than 30% by volume with respect to the volume sum of polyphenylene sulfide resin, glass fiber and copper alloy fiber taken as 100% by volume, the electric conductive resin composition is not favorable in view of the cost performance.

By mixing the three components, i.e. the PPS resin, glass fiber and metal fiber, by the above-mentioned mixing ratio, the composition can be made into an electric thermoplastic resin composition of this invention which is extremely good in durability, physical properties, moldability and cost performance.

The electric conductive resin composition of this invention has the following advantages:

The electric conductive resin composition has thermal resistance property, thermal shock resistance property, humidity resistance property, water resistance property and oil resistance property, and all of the properties are compatible with an application to an automobile engine room. No conventional material has all of the properties.

Because the electric conductive resin composition has superior durability, it is possible to make enclosures for electronics apparatuses with the resin, the enclosures which have been made by aluminum die casting. Because the enclosure can be made by injection molding, the finishing process indispensable for the enclosures made by aluminum die casting has been done away with, and sharp reduction in man-hour requirement and cost has been enabled.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
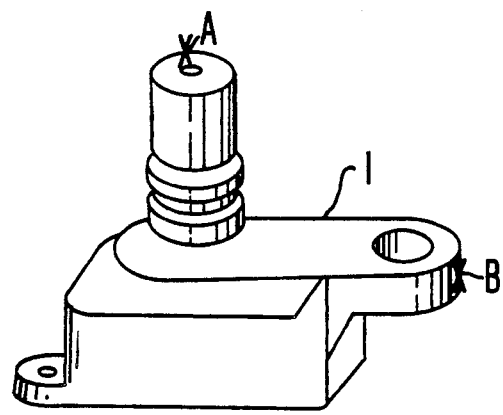
FIG. 1 is a perspective illustration of an appearance of an automobile ESC (Electronic Skid Control) sensor case to be made from a preferred embodiment of an electric conductive resin composition according to this invention.

Having generally described this invention, a further understanding can be obtained by reference to certain specific preferred embodiments which are provided herein for purposes of illustration only and are not intended to be limiting unless otherwise specified.

First Preferred Embodiment

Eighteen (18) parts by weight of a PPS resin (PR-06 produced by Phillips Co., Ltd.), 18 parts by weight of a PPS resin containing glass fiber by 40 weight % (A504 produced by Toray Co., Ltd.) and 64 parts by weight of 6-4 brass fiber (produced by Aisin Kako Co., Ltd. $\phi 60$ $\mu m \times 3$ mm) were dry-blended well. Following the dry-blending, the mixture was mixed and extruded at cylinder temperatures of 300° to 320° C. with a 2-axis mixing extruder. After the mixing and extruding, pellets were produced by cutting extruded substances with an pelletizer.

As shown in the line, designated with "First Preferred Embodiment," of Table 1, these pellets had the glass fiber content of 20% by weight with respect to the weight sum of PPS resin and glass fiber taken as 100% by weight and the brass fiber content of 24% by volume with respect to the volume sum of PPS resin, glass fiber and brass fiber taken as 100% by volume.

Test pieces of 100 mm×100 mm×1.2 mm in size were molded from these pellets with an ordinary injection-molding machine, and their volume resistivities were measured.

The test pieces were then subjected to the following tests, and their volume resistivities were measured after the test to verify their volume resistivity changes:

TABLE 1

| Test Sample | | Composition | | Initial Resistance | *3 Test Results | | | |
|---|---|---|---|---|---|---|---|---|
| | | | | | After Heat Resistance Test (140° C. × 500 hr.) | After Thermal Shock Test (120 −40° C. × 1000 cycles) | After Humidity Resistance Test (80° C. × 95% R.H. × 500 hr.) | After Oil Resistance Test (140° C. × 500 hr.) |
| | Resin | *1 GF (wt %) | *2 MF (vol %) | | | | | |
| 1st Preferred Embodiment | Test Piece | PPS | 20 | 24 | $1.2 \times 10^{-2}$ | $1.9 \times 10^{-2}$ | $2.1 \times 10^{-2}$ | $1.4 \times 10^{-2}$ | $1.5 \times 10^{-2}$ |
| 2nd Preferred Embodiment | ESC Sensor Case | PPS | 20 | 24 | 0.08 | 0.10 | 0.12 | 0.08 | 0.09 |
| 3rd Preferred Embodiment | Pneumatic Sensor Case | PPS | 20 | 24 | 0.07 | 0.10 | 0.13 | 0.07 | 0.08 |
| 4th Preferred Embodiment | Speed Control CPU Case | PPS | 25 | 28 | 0.18 | 0.22 | 0.22 | 0.19 | 0.18 |
| Comparative Example 1 | Test Piece | PPS | 35 | 28 | $5.5 \times 10^0$ | — | — | — | — |
| Comparative Example 2 | ESC Sensor Case | PPS | 10 | 20 | 0.09 | — | — | — | — |
| Comparative Example 3 | Test Piece | PBT | 20 | 24 | $1.3 \times 10^{-2}$ | $8.2 \times 10^0$ | $3.5 \times 10^2$ | $1.9 \times 10^{-1}$ | $2.8 \times 10^{-1}$ |
| Comparative Example 4 | Test Piece | Modified PPO | 20 | 24 | $2.8 \times 10^{-2}$ | $1.2 \times 10^1$ | $5.8 \times 10^1$ | $3.6 \times 10^{-2}$ | $3.9 \times 10^{-1}$ |
| Comparative Example 5 | Test Piece | PA66 | 20 | 24 | $1.9 \times 10^{-2}$ | $2.3 \times 10^{-2}$ | $6.0 \times 10^{-1}$ | $5.4 \times 10^4$ | $9.8 \times 10^{-2}$ |

*1: The glass fiber content is the weight % of the glass fiber with respect to the weight sum of the resin and glass fiber taken as 100% by weight.
*2: The total fiber content is the volume % of the metal fiber with respect to the volume sum of the resin, glass fiber and metal fiber taken as 100% by volume.
*3: The resistance values for the 1st Preferred Embodiment, Comparative Examples, 1, 3, 4 and 5 are volume resistivity ($\Omega \cdot$ cm).
The resistance values for the 2nd, 3rd, and 4th Preferred Embodiments and Comparative Example 2 are actual resistance ($\Omega$).

a heat resistance test, in which the test pieces were heated at 140° C. for 500 hr.;

a thermal shock test, in which the test pieces were subjected to heating at the temperature of 120° C. for 30 min. and cooling at the temperature of −40° C. for 30 min. in turn. The heating-cooling cycle was repeated 1000 cycles;

a humidity resistance test, in which the test pieces were subjected to 95% relative humidity at the temperature of 80° C. for 500 hr.; and an oil resistance test, in which the test pieces were immersed in an engine oil at 140° C. for 500 hr.

The volume resistivity measurement was done in the following order:

First, electrode application points were ground gently with a water resistant grinding paper;

Second, electric conductive silver paste (D-500 produced by Fujikura Kasei Co., Ltd.) was applied on the electrode application points;

Finally, the volume resistivities of the test pieces were measured with a digital multi-meter (YHP-3478A produced by Yokogawa Hewlette Packard Co., Ltd.) employing the four-line resitance measurement method.

The results of the volume resistivity measurements after the above-mentioned durability tests are listed in the line, designated with "First Preferred Embodiment," of Table 1. As can be seen from the results, the test pieces made from the electric conductive resin composition of the preferred embodiment did not show increased volume resistivities, and had good durabilities.

Second Preferred Embodiment

Automobile ESC (Electronic Skid Control) sensor cases 1 illustrated in FIG. 1 were molded with the same pellets produced in the First Preferred Embodiment.

The electric resistances between portions "A" and "B" of the automobile ESC sensor cases 1 were measured.

The measurement of the electric resistances between the portions "A" and "B" of the automobile ESC sensor cases 1 were done in the following order:

First, portions "A" and "B" were ground gently with a water resistant grinding paper;

Second, the electric conductive silver paste (D-500 produced by Fujikura Kasei Co., Ltd.) was applied on the portions "A" and "B";

Finally, the electric resistances between the portions "A" and "B" were measured with the digital multimeter (YHP-3478A produced by Yokogawa Hewlette Packard Co., Ltd.) employing the four-line resistance measurement method.

Following the measurement of the electric resistances, the automobile ESC sensor cases 1 were subjected to the same durability tests mentioned in the First Preferred Embodiment. Thereafter, the electric resistances between the portions "A" and "B" of the automobile ESC sensor cases 1 were measured again in the same manner. The results of the electric resistance measurements after the durability tests are listed in the line, designated with "Second Preferred Embodiment," of Table 1.

A product employing the automobile ESC sensor case is required to be free from malfunction even when it is subjected to a magnetic field having a magnetic field strength of up to 200 V/m. In order to achieve the requirement, it has been found that the electric resistance between portions "A" and "B" of the automobile ESC sensor case should be 0.3 $\Omega$ or less. As can be seen from Table 1, the automobile ESC sensor cases 1 satisfied the requirement even after the above-mentioned durability tests.

Third Preferred Embodiment

Figure 2:
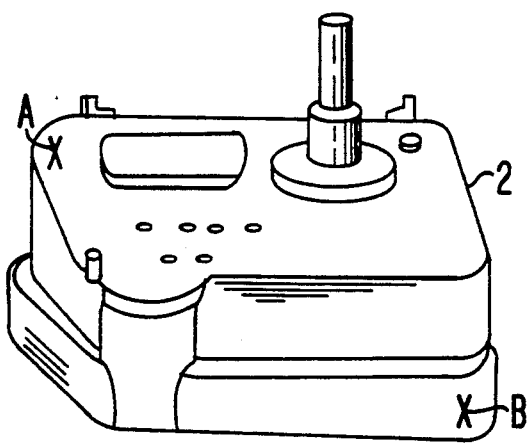
FIG. 2 is a perspective illustration of an appearance of an automobile pneumatic sensor case to be made from a preferred embodiment of an electric conductive resin composition according to this invention.

Automobile pneumatic sensor cases 2 illustrated in FIG. 2 were molded with the same pellets produced in the First Preferred Embodiment. The electric resistances between portions "A" and "B," as shown in FIG. 2, of the automobile pneumatic sensor cases 2 were measured.

The measurement of the electric resistances between the portions "A" and "B" of the automobile pneumatic sensor cases 2 was done in the same manner as described in the Second Preferred Embodiment. Thereafter, the automobile pneumatic sensor cases 2 were subjected to the above-mentioned durability tests, and the measurement of the electric resistances between the portions "A" and "B" after the durability tests was also done in the same manner as described in the Second Preferred Embodiment. The results of the electric resistance measurements after the durability tests are also listed in the line, designated with "Third Preferred Embodiment," of Table 1.

Automobile pneumatic sensor cases 2 of this type should exhibit the electric resistance of 0.5$\Omega$ or less between the portions "A" and "B." As set forth in Table 1, the automobile pneumatic sensor cases 2 made from the pellets produced in the First Preferred Embodiment satisfied the requirement even after the above-mentioned durability tests.

Fourth Preferred Embodiment

Pellets were produced as described in the First Preferred Embodiment with the exceptions that the glass fiber content was increased to 25% by weight with respect to the weight sum of PPS resin and glass fiber taken as 100% by weight, and that 7-3 brass fiber (produced by Kobe Chutetsu Co., Ltd., $\phi 90\ \mu m \times 3$ mm) was used, and that the brass fiber content was increased to 28% by volume with respect to the volume sum of PPS resin, glass fiber and brass fiber taken as 100% by volume.

Figure 3:
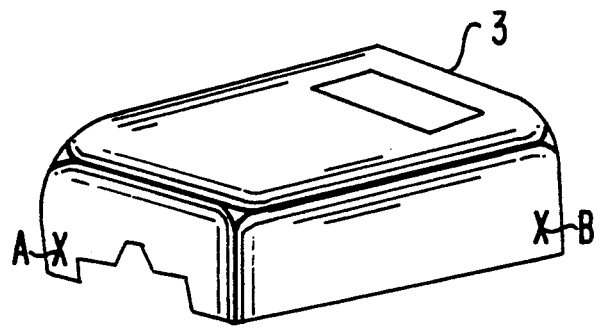
FIG. 3 is a perspective illustration of an appearance of an automobile speed control CPU case to be made from a preferred embodiment of an electric conductive resin composition according to this invention.

Automobile speed control CPU cases 3, as illustrated in FIG. 3, were molded with the pellets. The electric resistances between portions "A" and "B", as shown in FIG. 3, of the automobile speed control CPU cases 3 were measured as described in the Second Preferred Embodiment. Thereafter, the automobile speed control CPU cases 3 were subjected to the durability tests described in the First Preferred Embodiment, and the electric resistances between the portions "A" and "B" after the durability tests were measured similarly. The results of the electric resistance measurements after the durability tests are also listed in the line, designated with "Fourth Preferred Embodiment," of Table 1.

Automobile speed control CPU cases 3 of this type should exhibit the electric resistance of 1$\Omega$ or less between the portions "A" and "B." As set forth in Table 1, the automobile speed control CPU cases 3 made from the pellets satisfied the requirement even after the above-mentioned durability tests.

COMPARATIVE EXAMPLE 1

Pellets were produced as described in the First Preferred Embodiment with the exceptions that the glass fiber content was increased to 35% by weight with respect to the weight sum of PPS resin and glass fiber taken as 100% by weight, and that the brass fiber content was increased to 28% by volume with respect to the volume sum of PPS resin, glass fiber and brass fiber taken as 100% by volume. The test pieces were molded with the pellets as described in the First Preferred Embodiment, and their volume resistivities were also measured. However, the test pieces had the high volume resistivity of $5.5 \times 10^{6} \Omega.cm$, and did not exhibit sufficient electromagnetic wave shielding property.

When the brass fiber content was further increased, the test pieces could not be molded with such composition because the composition exhibited decreased flowability.

COMPARATIVE EXAMPLE 2

The automobile ESC (Electronic Skid Control) sensor cases 1 illustrated in FIG. 1 were molded with the pellets described in the Second Preferred Embodiment with the exceptions that the glass fiber content was decreased to 10% by weight with respect to the weight sum of PPS resin and glass fiber taken as 100% by weight, and that the brass fiber content was decreased to 20% by volume with respect to the volume sum of PPS resin, glass fiber and brass fiber taken as 100% by volume.

The electric resistances between the portions "A" and "B" of the automobile ESC sensor cases 1 were measured similarly, and were 0.09Ω. The value is well on the level allowing the electromagnetic wave shielding property. However, the automobile ESC sensor cases 1 were found to have a problem in actual applications because they cracked and broke when subjected to a drop test, in which molded substances were dropped from the height of 1.5 m to a concrete floor.

COMPARATIVE EXAMPLE 3

In this Comparative Example 3, a polybutylene terephthalate (hereinafter referred to as PBT) resin (Duranex 2002 produced by Polyplastics, Co., Ltd.) and a PBT resin containing glass fiber by 30% by weight (Duranex 3306 produced by Polyplastics, Co., Ltd.) were used for the resin component. As described in the First Preferred Embodiment, raw materials were mixed so as to produce a composition having the glass fiber content of 20% by weight with respect to the weight sum of PPS resin and glass fiber taken as 100% by weight and the brass fiber content of 24% by volume with respect to the volume sum of PPS resin, glass fiber and brass fiber taken as 100% by volume, and pellets were produced after mixing and extruding.

The test pieces identical with those of the First Preferred Embodiment were molded with the pellets, and subjected to the tests. The results of the tests are set forth in the line, designated with "Comparative Example 3," of Table 1.

It is understood from Table 1 that the test pieces exhibited increased electric resistances after the heat resistance test and the thermal shock test. The increased electric resistances were on the level disallowing the sufficient electromagnetic wave shielding property.

COMPARATIVE EXAMPLE 4

In this Comparative Example 4, modified polyphenylene oxide (hereinafter referred to as PPO) resin containing glass fiber by 20% by weight (GFN2J produced by Engineering Co., Ltd.) were used for the resin component. The raw materials were molded into the test pieces as set forth in Comparative Example 3, and the test pieces were tested. The results of the tests are set forth in the line, designated with "Comparative Example 4," of Table 1.

As can be seen from the results, the test pieces exhibited increased electric resistances after the heat resistance test and the thermal shock test.

COMPARATIVE EXAMPLE 5

In this Comparative Example 5, polyamide 66 resin containing glass fiber by 20% by weight (662020GC produced by Ube Kosan Co., Ltd.) were used for the resin component. The raw materials were molded into the test pieces as set forth in Comparative Example 3, and the test pieces were tested. The results of the tests are set forth in the line, designated with "Comparative Example 5," of Table 1.

It is clear from Table 1 that the polyamide electric conductive resin composition was superior in the heat resistance property and the oil resistance property, but exhibited a sharp increase in the electric resistances after the humidity resistance test.

Thus, the electric conductive resin compositions of the First, Second, Third and Fourth Preferred Embodiments were found to be an optium material for enclosures for automobile electronics apparatuses which are disposed outside the passenger room, such as automobile electronics skid control sensor cases, pneumatic sensor cases, electronics fuel injection CPU cases, speed sensor cases, direction sensor cases, fuel flow sensor cases and obstacle sensor cases.

Having now fully described the invention, it will be apparent to one of ordinary skill in the art that many changes and modifications can be made thereto without departing from the spirit or scope of the invention as set forth herein.

What is claimed is:

1. An electric conductive polyphenylene sulfide resin composition comprising:
    from 15 to 30% by weight of glass fiber with respect to the weight sum of polyphenylene sulfide resin and glass fiber taken as 100% by weight; and
    from 20 to 30% by volume of copper alloy fiber with respect to the volume sum of polyphenylene sulfide resin, glass fiber and copper alloy fiber taken as 100% by volume.

2. An electric conductive polyphenylene sulfide resin composition according to claim 1, wherein said glass fiber has a length of from 1 to 20 mm and a diameter of from 4 to 50 μm.

3. An electric conductive polyphenylene sulfide resin composition according to claim 1, wherein said copper alloy fiber has a length of from 0.5 to 4 mm and a diameter of from 30 to 150 μm.

4. An enclosure for an automobile electronics apparatus molded with an electric conductive polyphenylene sulfide resin composition comprising:
    from 15 to 30% by weight of glass fiber with respect to the weight sum of polyphenylene sulfide resin and glass fiber taken as 100% by weight; and
    from 20 to 30% by volume of copper alloy fiber with respect to the volume sum of polyphenylene sulfide resin, glass fiber and copper alloy fiber taken as 100% by volume.

5. An electric conductive polyphenylene sulfide resin composition comprising:
    from 15 to 30% by weight of inorganic filler with respect to the weight sum of polyphenylene sulfide resin and inorganic filler taken as 100% by weight, wherein said inorganic filler is glass fiber;
    from 20 to 30% by volume of electric conductive metal fiber with respect to the volume sum of polyphenylene sulfide resin, inorganic filler and electric conductive metal fiber taken as 100% by volume.

6. An electric conductive polyphenylene sulfide resin composition according to claim 5, wherein said glass fiber has a length of from 1 to 20 mm and a diameter of from 4 to 50 μm.

7. An electric conductive polyphenylene sulfide resin composition according to claim 5, wherein said electric conductive metal fiber is at least one selected from the group consisting of copper alloy fiber, copper fiber and stainless steel fiber.

8. An electric conductive polyphenylene sulfide resin composition according to claim 7, wherein said electric conductive metal fiber is copper alloy fiber.

9. An electric conductive polyphenylene sulfide resin composition according to claim 8, wherein said copper alloy fiber has a length of from 0.5 to 4 mm and a diameter of from 30 to 150 μm.

10. An enclosure for an automobile electronics apparatus molded with an electric conductive polyphenylene sulfide resin composition comprising:
   from 15 to 30% by weight of inorganic filler with respect to the weight sum of polyphenylene sulfide resin and inorganic filler taken as 100% by weight, wherein said inorganic filler is glass fiber; and
   from 20 to 30% by volume of electric conductive metal fiber with respect to the volume sum of polyphenylene sulfide resin, inorganic filler and electric conductive metal fiber taken as 100% by volume.

11. An electric conductive polyphenylene sulfide resin composition according to claim 8, wherein said copper alloy fiber is brass fiber.

12. An enclosure for an automobile electronics apparatus according to claim 10, wherein said electric conductive metal fiber is at least selected from the group consisting of copper alloy fiber, copper fiber and stainless steel fiber.

13. An enclosure for an automobile electronics apparatus according claim 12, wherein said electric conductive metal fiber is copper alloy fiber.

14. An enclosure for an automobile electronics apparatus according to claim 13, wherein said copper alloy fiber is brass fiber.

15. An enclosure for an automobile electronics apparatus according to claim 10, wherein said glass fiber has a length of from 1 to 20 mm and a diameter from 4 to 50 micrometers.

16. An enclosure for an automobile electronics apparatus according to claim 13, wherein said copper alloy fiber has a length of from 0.5 to 4 mm and a diameter from 30 to 150 micrometers.

* * * * *

UNITED STATES PATENT AND TRADEMARK OFFICE
CERTIFICATE OF CORRECTION

PATENT NO. : 5,093,037
DATED : March 3, 1992
INVENTOR(S) : Tamio Ohi, et al

It is certified that error appears in the above-indentified patent and that said Letters Patent is hereby corrected as shown below:

```
Column 1, line 67, add --,-- after "amount".
Column 2, line 64, change "enclosure" to --enclosures--.
Col. 3, Table 1 *2, change "The total fiber" to --The metal fiber--.
```

Signed and Sealed this

Twenty-ninth Day of June, 1993

Attest:

MICHAEL K. KIRK

Attesting Officer

Acting Commissioner of Patents and Trademarks